Dec. 19, 1933.   G. H. CLAMER   1,940,622
ELECTRIC INDUCTION FURNACE METHOD
Filed Feb. 10, 1932
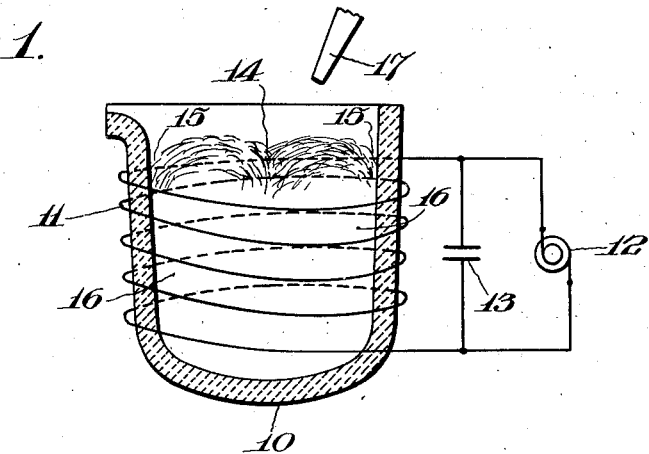
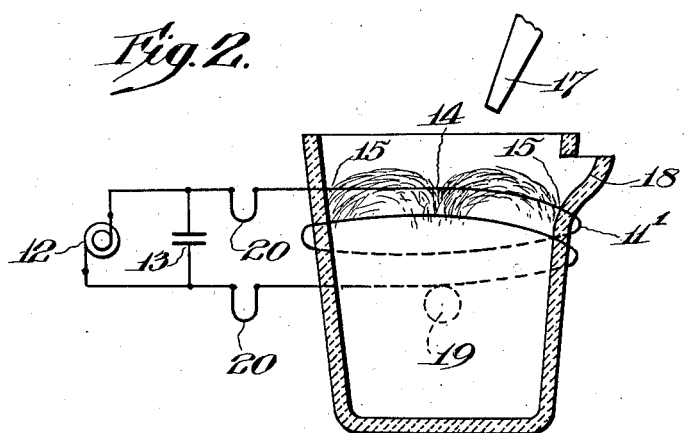
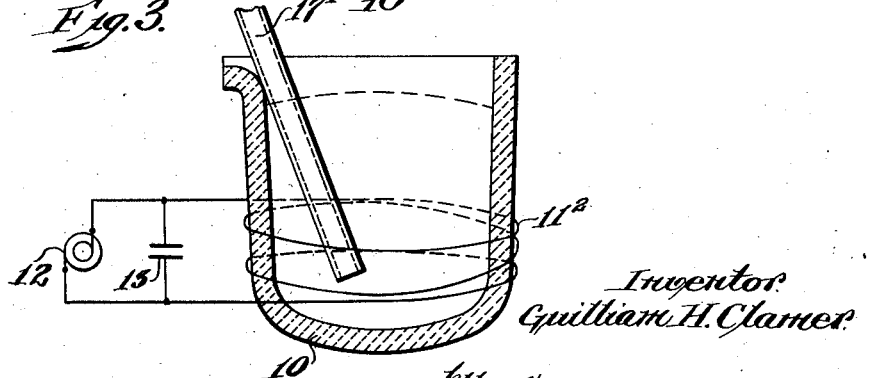
Inventor
Guilliam H. Clamer Patented Dec. 19, 1933

1,940,622

UNITED STATES PATENT OFFICE 1,940,622

ELECTRIC INDUCTION FURNACE METHOD

Guilliam H. Clamer, Atlantic City, N. J., assignor to Ajax Electrothermic Corporation, Ajax Park, N. J., a corporation of New Jersey Application February 10, 1932. Serial No. 592,113

8 Claims. (Cl. 75—22.5)

My invention relates to methods and apparatus for treating the charge in a coreless induction furnace. This application is a continuation in part of my application, Serial Number 341,291, for Electric induction furnace and method of operating it, filed February 20, 1929.

A purpose of my invention is to concentrate induced current near the surface of the charge so as to develop abnormal mixing at the surface in order to increase the rate of reaction of the charge with treating materials applied at the surface.

A further purpose is to concentrate stirring at the point of application of treating materials to a charge.

A further purpose is to produce a sufficient crowning of the molten pool so that the central region of the surface of the pool will be free from slag or other covering, as well as from surface films, and the slag or reaction products will accumulate at the edge of the surface.

A further purpose is to apply treating or alloying materials, whether gases, liquids or solids, at the exposed portion of the crown.

A further purpose is to introduce alloying or treating materials (gases, liquids, or solids) into the outwardly and downwardly flowing stream of charge near the crown, so that these materials will quickly come in contact with sub-surface charge without excessive exposure at the surface, where, for example, they would suffer from oxidation or otherwise.

A further purpose is to make use of the crowning of the molten pool, and more particularly of the circumferential surrounding depressed ring, as well as of the radially outward surface flow, to collect the oxidation products about the outer limits of the pool, and to remove these oxidation products at intervals in any suitable manner, such as by tilting the furnace and pouring them off through a side opening or spout.

A further purpose is to provide a tool, as it were, for use in the treatment of a charge already melted, so that mixing for the addition of treating gases, or for increasing the rapidity of reactions with treating gases, may be obtained with very little absorption of electrical energy.

A further purpose is to stir at a localized zone of treating application and/or to heat at that zone, so that stirring or heating may be selectively employed to control the reaction, alloying, or other metallurgical step.

Further purposes will appear in the specification and in the claims.

I have illustrated the applications of my invention by a few forms only, selecting them with a view to the best illustration of the principles involved.

Figures 1, 2 and 3 are diagrammatic views showing largely in section, with diagrammatic windings in all figures, apparatus by which my invention may be carried out.

In the drawing similar numerals indicate like parts.

In the past molten charge, especially metal, has been treated by the application of gases or other materials with or without stirring, but without intelligent choice of the character and point of application of the stirring, without sufficient stirring to effect the purpose and without proper concentration of whatever stirring took place to localize it where the reaction was sought.

It is my intention to use induced electric current from a supply within the lower range of frequencies rather than of high frequency. Most desirably I use commercial frequency.

As an additional or alternate step I may employ high frequency where heating is preferable to stirring. I may also heat while I stir.

All of the attempts in the past to apply treating materials to a molten pool have encountered the difficulty that the slag, being of lower density than the charge, floats on top, and application directly to the charge is not possible without the use of special means. Even though the slag be drawn off temporarily to permit the treatment of the charge, the surfaces of many metals will oxidize so rapidly that films are invariably present on the surfaces when the latter are exposed to the air for any extended period.

By my invention I make it possible to apply treatment directly to the surface or at a predetermined point anywhere below the surface of the charge without interference from any intermediate slag covering or film.

Melting of the charge preliminary to its treatment may be effected in large quantities by fuel furnaces or arc furnaces, for example, to great advantage by reason of the bulk of the charge handled or by the induction furnace in which it is to be treated, where it is desired to make this a heating furnace as well as a treating furnace. When the charge is to be treated with slag or air blast or by addition of alloying or chemically treating materials, it is usually desirable to treat the charge in smaller units.

As my invention relates to a treating operation rather than a heating operation, I have assumed that the charge would be melted elsewhere, in any suitable furnace not shown, although it would of course be possible, as indicated above, but often not desirable, to melt in the treating furnace.

The furnace crucible 10 shown in Figure 1 is surrounded by a coil 11 supplied with alternating current, preferably of commercial frequency, from a source 12. The power factor may be corrected by condenser means indicated at 13.

For application of air or treating gases or solid or molten treating or alloying materials to the surface of the pool, I prefer to remove preliminarily most of the slag so that it will not by any chance rise above the depressed edge of the crowned surface of the pool.

I prefer not to heat the charge to any appreciable extent during the treating step, although this could be done if desired. The charge may be heated by chemical reactions taking place within it, by the heat of formation of alloys, or may retain sufficient sensible heat from a previous superheating to permit of the slight cooling which would take place during treating and thus require little or no heating during the process.

In many metallurgical operations where thorough stirring is required, heating is not necessary and would be detrimental or at least wasteful. Where heating is desired, however, it may be applied, either concurrently or at another time from stirring.

The heating effect upon a charge within an inductor coil carrying alternating current is dependent upon and is very nearly proportional to the frequency as well as to the square of the ampere turns, but the stirring effect upon the charge of the alternating current passing through an inductor is largely independent of the frequency and is dependent upon the square of the ampere turns. Therefore, at low frequency, I may obtain stirring with relatively little heating effect, while at high frequency I would obtain the same stirring with considerable heating effect.

As I wish usually to obtain stirring without great heating effect I will normally maintain the ampere turns at a minimum, as well as use low frequency.

Thus, it will be seen that I may choose between the use of stirring with or stirring without appreciable heating effect. If I desire the heating effect for a given number of ampere turns, the frequency should be increased, otherwise I will employ low, preferably commercial frequency.

In Figure 1 the turns of the inductor coil cover substantially the entire vertical height of the charge in the crucible. In this form, unless I desire to heat the charge during treating, I will use relatively low amperage and low frequency.

The stirring in the furnace of Figure 1 is substantially vertically upward at the center, as for example 14, breaking at the top and flowing outwardly to the circumference as at 15 and returning downward along the outside 16.

Where the inductor coil covers substantially the entire vertical height of the charge, as in Figure 1, stirring takes place throughout substantially the entire charge depth, but where the inductor coil, as 11' in Figure 2, is short as compared with the depth of the charge, the bulk of the stirring will take place in that part or zone of the charge within and close to the coil. The stirring will always be upward at the center of the zone in which it takes place.

Air, heated or otherwise, may be applied to the molten charge by an air blast as through a nozzle 17. The heat of oxidation will ordinarily be sufficient to maintain the temperature of the bath, so that it will be unnecessary to supply heat from the inductor coil.

Circulation upward and outward at the middle of the top of the furnace pool results in crowning of the molten charge at the center with a resultant falling off of the height of the pool toward the outer edge. The extent of this crowning can be altered considerably by the location of the inductor coil and by the amount of stirring energy provided within it.

When using an air or gas blast on the surface it is desirable to crown the charge considerably so that any slag or impurity on the surface will collect about the outer edge, leaving the center of the crown clean and bright to react to the best advantage with the oxygen of the air.

Crowning of the charge may be controlled by the location of the coil, keeping in mind that within reasonable limits raising the coil increases the stirring activity at the top of the furnace and reduces the depth to which the stirring is effective. The most complete pool stirring is secured by distributing the coil about the entire depth of the pool.

It will be evident that I may increase the rapidity of stirring at any given point in the charge by concentrating the number of ampere turns of the inductor coil about that point. If treating materials be supplied at this point of stirring concentration, the rate of reaction will be greater than if the materials were supplied at a point at which the charge was less actively stirred.

Also, the charge at the point 14 near the center of the crown comes fresh from the submerged portions of the pool, and therefore has not had time nor opportunity to oxidize or become covered with any film or coating. Charge from this point is carried outward and down again into the body of the pool. Therefore, the point 14 is ideal for the application of treating materials, not only because the charge is free from contamination and from protective covering at this point, but also because the charge is immediately afterward carried out and downward into the body of the pool, taking with it any treating ingredient which may have been applied.

Not only is the top of the crown a desirable point for the application of an oxidizing blast, but it is very desirable as a place for applying a treating gas of any kind, whether it be to reduce an oxidized material, in which case carbon monoxide might be used, or to cause the occlusion of any suitable gas, or otherwise.

I might also apply solid treating ingredients at the center of the crown in order that they might be carried down into the bath without coming in contact with slag or other coatings. For example, this would be a desirable point for the application of deoxidizing agents such as metallic aluminum. Furthermore, alloying ingredients, particularly special alloying ingredients such as are used in the making of alloy steels, might be desirably applied at the center of the crown so that they would escape any extended contact with slag and with the highly oxidized surface of the pool, thus tending to reduce the percentage of these ingredients carried over into the slag.

Alloying or treating ingredients may be applied through the nozzle of Figures 1 or 2, with or without feeding blast, or may be applied separately.

In Figure 2 air or gas treatment is contemplated through the nozzle 17, and it is desired as in Figure 1 to have the crowned surface as bright and clean as possible. By reason not only of the greater height at the center produced by crowning, but also because of the continuous movement of the charge from the top toward the sides, any slag products formed which might otherwise cover the surface are carried to the circumference of the pool. The crucible 10' of Figure 2 is shown as provided with a spout 18 and is mounted upon trunnions 19 so that the oxidation products may be scraped or poured out through the spout when the crucible has been slightly tilted. Any suitable provision such as the slack 20 may be made to permit movement of the crucible without interference with the electrical connections of the coil.

In Figure 3 I show apparatus very similar to that of Figure 1 except that air or gas is blown in beneath the surface of the charge from a nozzle 17', and stirring is concentrated at the point of treating application by the use of a relatively short inductor coil 11² surrounding this point. Thus the rate of reaction of the treating material with the charge is greater than it would be if the stirring were not concentrated at this point. It will be understood that my invention is broad enough to include the application of any treating material, whether gas, liquid or solid.

The coil of Figure 3, as well as the coils of Figures 1 and 2, may stir merely, without substantial heating or may be used to heat the bath also. In Figures 2 and 3 the local heating may be used to accentuate chemical action or to facilitate the formation of an alloy.

The methods and constructions illustrated permit great flexibility of handling of the molten charge for treating purposes with or without the use of heating and make it possible to heat the charge or to treat it by any of the recognized processes of air or gas blast or by adding treating or alloying ingredients to great advantage.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. The method of increasing the rate of reaction of treating materials or of admixture of alloying materials with a pool of molten charge which consists in supplying the treating or alloying materials locally to the charge and in abnormally concentrating induced stirring current at the locality of treating application with regard to the stirring current elsewhere in the charge.

2. The method of increasing the rate of reaction of a treating material or of admixture of an alloying material with a pool of molten charge which consists in supplying the treating or alloying material locally to the charge and in abnormally concentrating stirring free from substantial heating at the locality of treating or alloying application with regard to the stirring elsewhere in the charge.

3. The method of increasing the rate of reaction of a treating material or of admixture of an alloying material with a pool of molten charge which consists in supplying the treating or alloying material locally to the charge and in abnormally concentrating stirring and heating at the locality of treating or alloying application with regard to the stirring and heating elsewhere in the charge.

4. The method of increasing the rate of reaction of a surface treating material or of admixture of an alloying material with a pool of molten charge which consists in supplying the treating or alloying material to the surface of the charge and abnormally stirring the surface by induced current concentrated at the upper part of the charge as compared with the condition elsewhere in the charge.

5. The method of increasing the rate of reaction of a surface treating material or of admixture of an alloying material with a pool of molten charge which consists in supplying the treating or alloying material to the surface of the charge and in abnormally concentrating heating and stirring at the upper part of the charge as compared with the condition elsewhere in the charge.

6. The method of increasing the rate of reaction of a treating material or of admixture of an alloying material with a pool of molten charge which consists in supplying the treating or alloying material locally beneath the surface of the charge and abnormally concentrating stirring free from substantial heating at the locality of treating or alloying application with regard to the stirring elsewhere in the charge.

7. The method of increasing the rate of reaction of a treating material or of admixture of an alloying material with a pool of molten charge which consists in supplying the treating or alloying material locally beneath the surface of the charge and abnormally concentrating stirring and heating at the locality of treating or alloying application with regard to the stirring and heating elsewhere in the charge.

8. In the art of metallurgical treatment of a pool of molten metal, the method which consists in introducing a substance, which influences the character of the molten metal, locally to a part of the pool and in electrically stirring the molten metal at the place of introduction at a higher rate than that at which the metal in other parts of the pool is stirred.

GUILLIAM H. CLAMER.